(12) United States Patent
Hagen et al.

(10) Patent No.: US 12,480,967 B2
(45) Date of Patent: Nov. 25, 2025

(54) SYSTEM TO EVALUATE STRUCTURAL BEHAVIOR

(71) Applicant: SAP SE, Walldorf (DE)

(72) Inventors: Arnulf Hagen, Trondheim (NO); Henrik Loefaldli, Trondheim (NO); Joergen Sverdrup-Thygeson, Trondheim (NO); Oeystein Stranden, Trondheim (NO); Ketil Skjaastad, Trondheim (NO)

(73) Assignee: SAP SE, Walldorf (DE)

( * ) Notice: Subject to any disclaimer, the term of this patent is extended or adjusted under 35 U.S.C. 154(b) by 620 days.

(21) Appl. No.: 17/500,093

(22) Filed: Oct. 13, 2021

(65) Prior Publication Data
US 2023/0113659 A1  Apr. 13, 2023

(51) Int. Cl.
*G01P 1/00* (2006.01)
*G01P 15/00* (2006.01)
*G08B 21/18* (2006.01)

(52) U.S. Cl.
CPC ............... *G01P 1/06* (2013.01); *G01P 15/00* (2013.01); *G08B 21/18* (2013.01)

(58) Field of Classification Search
CPC ........ G01P 1/06; G01P 15/00; G01M 5/0008; G01M 5/0066; G08B 21/18
See application file for complete search history.

(56) References Cited

U.S. PATENT DOCUMENTS

| | | | |
|---|---|---|---|
| 4,480,480 A | 11/1984 | Scott et al. | |
| 4,956,999 A * | 9/1990 | Bohannan | G01N 29/14 73/594 |
| 5,421,204 A | 6/1995 | Svaty, Jr. | |
| 8,830,477 B2 | 9/2014 | Schreiber et al. | |
| 10,436,759 B2 * | 10/2019 | Mann, III | G01N 29/46 |
| 2017/0097277 A1 * | 4/2017 | Kobayashi | G01P 3/66 |
| 2018/0306677 A1 * | 10/2018 | Mase | G01M 5/0033 |
| 2020/0191643 A1 | 6/2020 | Davis | |
| 2021/0302222 A1 * | 9/2021 | Kobayashi | G01M 5/0066 |

OTHER PUBLICATIONS

An, Yonghui et al., "A damage locatization method based on the 'jerk energy'", IOP Publishing, Smart Materials and Structures, Issue 23, (Jan. 2014), DOI:10.1088/0964-1726/23/2/025020, 13pgs.

(Continued)

*Primary Examiner* — Stephen D Meier
*Assistant Examiner* — Quang X Nguyen
(74) *Attorney, Agent, or Firm* — Buckley, Maschoff & Talwalkar LLC

(57) ABSTRACT

Systems and methods include reception, for each of a first plurality of consecutive time periods, of an acceleration value associated with a first location of a structure, determination of a first value of a first indicator based on absolute values of the acceleration values, determination of a second value of a second indicator based on absolute values of differences of consecutive one of the acceleration values, determination of a first value of an index based on the first value and the second value, determination of a physical characteristic of the structure based on the first value of the first indicator and the first value of the index, and transmission of an alert based on the physical characteristic.

18 Claims, 9 Drawing Sheets

(56) References Cited

OTHER PUBLICATIONS

Esen, Ismail "A Modified FEM for Transverse and Lateral Vibration Analysis of Thin Beams Under a Mass Moving with a Variable Acceleration", (Mar. 2017), http://dx.doi.org/10.1590/1679-78253180, (pp. 485-511, 27 total pages).
Abdullahi, Salami Ifedapo et al., "Accelerometer Based Structural Health Monitoring System on the Go: Developing Monitoring Systems with NI LabVIEW", International Journal of Online and Biomedical Engineering (iJOE)—eISSN: 2626-8493—iJOE, vol. 15, No. 7, Apr. 2019, https://www.i-joe.org, (pp. 32-51, 20 total pages).
Shahabadi, A. "Bridge Vibration Studies", The National Academies of Sciences, Engineering, and Medicine, (Sep. 1997), downloaded from https://www.trb.org/, Mar. 24, 2021, 2pgs.
Xueshan, Yang et al., "Jerk and Jerk Sensor", The 14th World Conference on Earthquake Engineering, Oct. 12-17, 2008, Beijing, China, 8pgs.
Fraser, Michael et al., "Sensor Network for Structural Health Monitoring of a Highway Bridge", Journal of Computing In Civil Engineering, vol. 24, No. 1, Jan./Feb. 2010, DOI: 10.1061/(ASCE)CP.1943-5487.0000005, (pp. 11-24, 14 total pages).

* cited by examiner

|  | | JI | | |
|---|---|---|---|---|
|  | | Falling/low | Stable | Increasing/high |
| ASUM | Falling/low | Lower load, more response in lower frequencies | Decreased load or (under some conditions, such as cold) increased stiffness in structure | Change in composition of load, load properties |
| | Stable | Structurally caused non-linearities or shift of motion to lower frequencies | No issue detected | More irregular motions in structure, alternatively increased stiffness |
| | Increasing/high | Potentially towards progressive collapse or excessive load changing structural behavior | Increased load (or unlikely decreased bearing capacity in structure) | Weakening structure with changed behaviour, or radically changed load situation |

FIG. 5

SYSTEM TO EVALUATE STRUCTURAL BEHAVIOR

BACKGROUND

Degradation in a structure such as a bridge may impact both its ability to carry load and resist forces (possibly resulting in increased motion under unchanged load and mass) and its resonant frequencies. Degradation may therefore be detected by detecting changes to these physical characteristics. According to some conventional approaches to detect degradation, motion detectors (e.g., accelerometers) are mounted to a structure and the signals output by the motion detectors are analyzed to attempt to detect changes to physical characteristics of the structure.

A simplest approach compares the amplitudes of the signals to predefined thresholds and provides a notification if a threshold is exceeded. Advanced approaches apply FFTs (Fast Fourier Transforms) to the signals to allow analysis of the frequency content of the underlying motions. Such analysis may include identification of intensity in various frequency bands, shifts in frequencies, and/or changes in intensity, each of which may be evidentiary of changes to either the physical system under analysis and/or the load to which the system is subjected.

The above-described threshold-based analysis of individual signals may be insufficient in many cases. Such analysis may produce too many false positives, thereby reducing confidence in the monitoring system. Moreover, threshold-based analysis may fail to identify true positives, thereby creating a false sense of security and potentially hazardous situations.

FFT analyses require exponentially-increasing amounts of processing resources as the number of samples under analysis increases. In this regard, a large number of accelerometers may be mounted on a structure being monitored (such as rotating equipment, a bridge or other complex mechanical system), with data being produced and delivered over three independent channels (e.g., x-y-z-directions) at a high frequency. Practical or economical limitations in processor capacity may therefore limit the feasible extent and depth of real-time FFT analysis.

Additionally, present observations cannot be suitably interpreted in isolation, but should be evaluated against historic data using statistical comparisons/regressions or more advanced machine-learning methods. This comparison requires continuous streaming, calculation (i.e., FFT) and storage of high-volume post-processed data. Since FFT is not additive, the results from an FFT over one period cannot readily be added to the results from an FFT over another period to determine the result over both periods seen together.

Systems are desired to efficiently use acceleration signals to identify changes in the physical state of a structure.

BRIEF DESCRIPTION OF THE DRAWINGS

FIG. 5 is a table illustrating physical characteristics corresponding various combinations of ASUM and JI values according to some embodiments.

DETAILED DESCRIPTION

The following description is provided to enable any person in the art to make and use the described embodiments. Various modifications, however, will be readily-apparent to those in the art.

Embodiments may provide a cost-efficient, fast, and versatile method to identify structural or loading anomalies through analysis of aggregated indicators. Such aggregated indicators are additive such that the sum of an indicator corresponding to a first time period and an indicator corresponding to a second time period is an indicator corresponding to the first period and the second period. The indicators may include a sum of absolute values of acceleration signals generated over a certain time period (e.g., 1 second, 1 minute, 1 hour), with a bias/static component removed (hereinafter, ASUM), a sum of absolute values of jerk (hereinafter, JSUM), where jerk is the first derivative of acceleration, and a Jerk Index (hereinafter, JI) calculated as JSUM divided by ASUM. In contrast to JSUM and ASUM, JI in and of itself is not additive.

Calculation of the aggregated indicators is suitable for performance at the computing system edge (e.g., local to the accelerometer(s)), and the calculated indicators may be transferred to the cloud via small payloads for further processing and storage. In some embodiments, the indicators are transferred only if an anomaly is detected by the edge based on the indicators, and detailed analysis is then performed on the cloud using FFT and/or Finite Element Analysis, for example, to confirm or refute the initial findings and to perform diagnostics as to the cause of the anomaly. According to some embodiments, the indicators are transferred to the cloud and cloud-based processing determines whether an anomaly exists based on the indicators and, if so, requests additional details (e.g., the original accelerometer signals) from the edge in order to perform more thorough analysis. In an alternative embodiment, all acceleration signals are transferred to the cloud and the indicators are calculated at the cloud.

Figure 1:
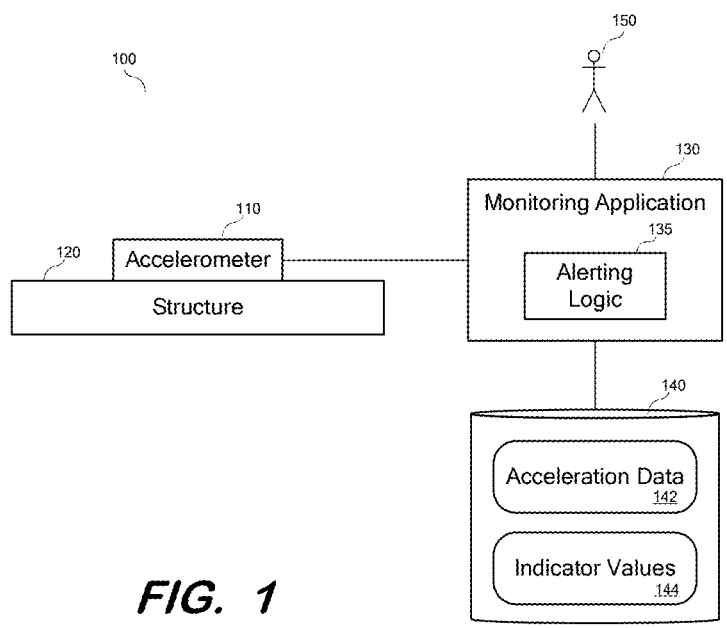
FIG. 1 is a block diagram of an architecture to evaluate structural behavior according to some embodiments.

FIG. 1 is a block diagram of an architecture of system 100 according to some embodiments. Each illustrated element of system 100 may be implemented using any suitable combination of computing hardware and/or software that is or becomes known. Such a combination may include implementations which apportion computing resources elastically according to demand, need, price, and/or any other metric. In some embodiments, two or more elements of system 100 are implemented by a single computing device. Two or more elements of system 100 may be co-located. One or more elements of system 100 may be implemented as a cloud service (e.g., Software-as-a-Service, Platform-as-a-Service).

Architecture 100 includes accelerometer 110 mounted to structure 120. Accelerometer 110 may comprise any device capable of generating signals representing its own acceleration. Structure 120 may comprise any physical system (e.g., a bridge, a turbine) for which detection of structural or loading anomalies is desired. Accelerometer 110 is mounted to structure 120 such that the signals generated by accelerometer 110 represent acceleration of the area of structure 120 to which accelerometer 110 is mounted.

As will be described below, accelerometer 110 may provide acceleration signals for each of multiple (e.g., x, y, z) directions. More than one accelerometer 110 may be mounted to structure 120, and the x, y, and z axes of two or more of such accelerometers might differ.

Accelerometer 110 provides acceleration signals to monitoring application 130. The acceleration signals may be transmitted wirelessly from accelerometer 110 to a base station (not shown) which in turn transmits the acceleration signals to monitoring application 130 over the Internet, but embodiments are not limited hereto. The acceleration signals may be generated and transmitted to monitoring application 130 in any format. In some embodiments, the signals are periodic samples (e.g., sampled every 0.01 s) and all the samples acquired over a prior predetermined time period (e.g., 5 min) are packaged together and transmitted to monitoring application 130 after the expiration of each predetermined time period.

Monitoring application 130 stores acceleration data associated with the received samples in storage system 140 as acceleration data 142. Storage system 140 may comprise any persistent storage that is or becomes known. Storage system 140 may be located remote from a server (e.g., on-premise, cloud-based virtual machine) on which monitoring application 130 executes.

Monitoring application 130 may determine and store indicator values 144 based on acceleration data 142. Details of the indicator values and the determination thereof will be described below. Monitoring application 130 includes alerting logic 135. According to some embodiments, alerting logic 135 analyses indicator values 144 and determines whether to generate an alert based thereon. The alert may indicate a structural or loading change, and may be generated based on historical trends within indicator values 144 as described below.

Such alerts may be pushed to user 150 of monitoring application 130. According to some embodiments, user 150 may access monitoring application 130 to review and analyze acceleration values 142 and/or indicator values 144 which are derived from acceleration values 142.

Figure 2:
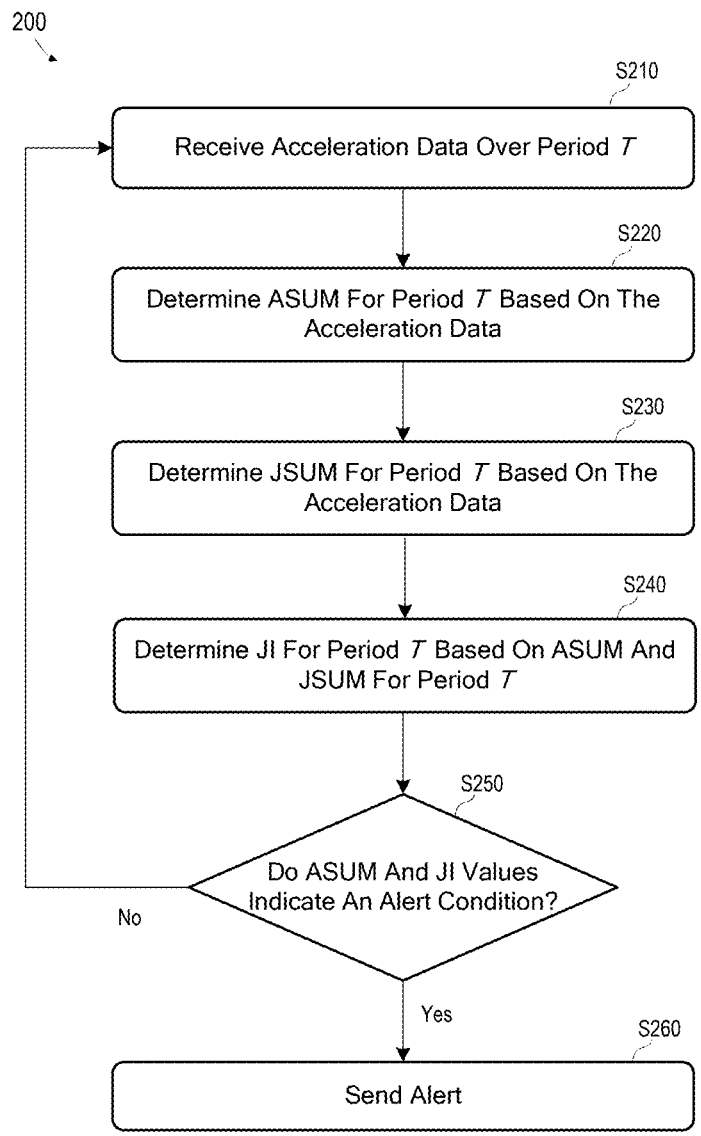
FIG. 2 comprises a flow diagram of a process to evaluate structural behavior and determine an alert condition according to some embodiments.

FIG. 2 comprises a flow diagram of process 200 to evaluate structural behavior and determine an alert condition according to some embodiments n according to some embodiments. Process 200 and all other processes mentioned herein may be embodied in program code executable by one or more processing units (e.g., processor, processor core, processor thread) and read from one or more of non-transitory computer-readable media, such as a hard disk drive, a volatile or non-volatile random access memory, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments therefore not limited to any specific combination of hardware and software.

Initially, at S210, acceleration data associated with a period T is received. As described above, the acceleration data may have been generated by an accelerometer mounted to a structure. The acceleration data may comprise sampled acceleration values (e.g., every 0.01 s) and the period T may be, for example, 5 minutes.

Process 200 will be described below as if the acceleration data represents acceleration in a single direction and were generated by a single accelerometer. If more than one accelerometer is mounted a structure, process 200 may be independently executed for each accelerometer. If each of the more than one accelerometers generates acceleration data for multiple directions, process 200 may be independently executed for each direction of each accelerometer.

In some embodiments, acceleration data is received from multiple accelerometers and consolidated at S210. For example, all acceleration data associated with a particular direction may be consolidated into a single representative time series. If the accelerators are rotated with respect to one another, the acceleration data received therefrom may be rotated to a common frame of reference prior to such consolidation.

Next, at S220, the ASUM is determined for period T based on the received acceleration data. Generally, the ASUM represents the area swept under the curve of the acceleration data. Computation of the ASUM therefore involves the use of the absolute values of the acceleration data.

According to some embodiments, ASUM (m/s)=$\Sigma_{i=1}^{N}$ (ABS($a_i-\bar{a}$)*$\Delta T$), where N=the number of measurements during period T (e.g., 5 min*60 s/min*100 measurements/s), $\Delta T$=time between measurements (e.g., 0.01 s), i=measurement number, $a_i$=measured acceleration value at measurement i, $\bar{a}$=average of acceleration values, $\Sigma_{i=1}^{N}$ ($a_i$)/N (over a time interval>>T). In the example formula above, each acceleration value is normalized by subtracting an average historical acceleration therefrom.

According to first principles in Newtonian mechanics, and assuming constant mass, acceleration of a point is proportional to the net force exerted on that point. This net force is the balance between external force (e.g., environmental or working load) and internal force (e.g., accumulation and release of spring energy). The sum of the magnitude of acceleration over a time period provides a measure of total impulse (sum of absolute changes in momentum) over that period. An increase in ASUM while mass remains constant either indicates a higher external load within an intact structure or reduced stiffness (i.e., weakening) in the structure under a constant load.

In practice, ASUM values are dominated by vibration/oscillation amplitudes which are insensitive to frequency. High loads and high dynamic response result in high ASUM values, generally regardless of how the kinetic energy distributes over various frequencies (assuming the normalization described above at [0031]). ASUM is in effect proportional to the area under an FFT curve.

Figure 3:
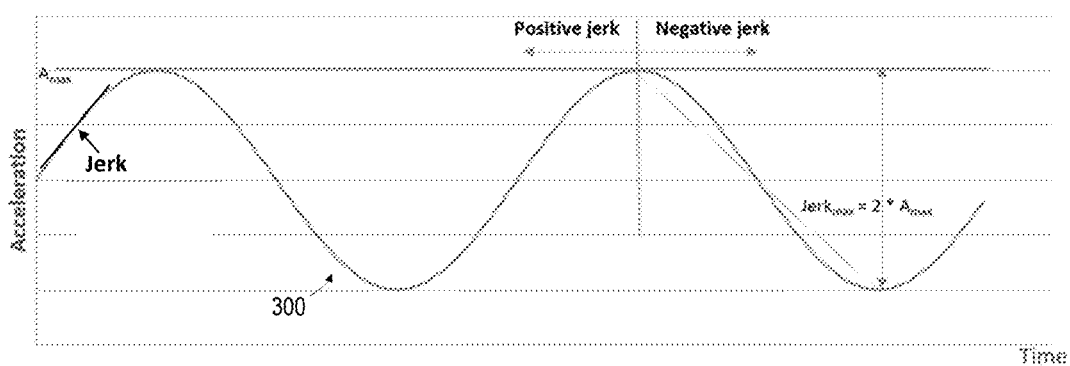
FIG. 3 illustrates a relationship between acceleration and jerk.

Jerk refers to the rate of change (i.e., first derivative) of acceleration. FIG. 3 illustrates curve 300 representing acceleration values samples over time which may be received at S210. Embodiments are not limited to a sinusoid or to any particular periodic waveform. Jerk at a given point is depicted as the slope of the tangent to curve 300 at the given point. In this regard, Jerk is a positive value at points of increasing acceleration and is a negative value at points of decreasing acceleration. FIG. 3 also shows the relationship of maximum jerk amplitude ($Jerk_{max}$) to maximum acceleration amplitude ($A_{max}$) as $Jerk_{max}=2*A_{max}$.

JSUM is determined for period T based on the received acceleration data at S230. As described with respect to ASUM, JSUM is determined based on the absolute values of jerk, and therefore represents the area swept by the curve of the first derivative of acceleration. According to some embodiments, JSUM (m/s$^2$)=$\Sigma_{i=1}^{N}$ABS($a_i$−$a_{i-1}$), where N=number of measurements during period T, i=measurement number, and $a_i$=measured acceleration value at measurement i.

Assuming constant mass and time interval, jerk is proportional to the net force acting over time increment $\Delta T$ when $\Delta T$ approaches zero. The jerk magnitude (i.e., absolute value) at a point indicates a change of applied external force and/or a change in internal action (i.e., shift between kinetic and potential energy) during $\Delta T$. An increased JSUM for a given period and given structure and given ASUM implies higher frequency vibrations, either due to changed external load or internal issues in the structure, known as jerking, or spasmic, motion. JSUM is roughly equally-sensitive to amplitudes and to frequencies. The dominant cause of change of JSUM with respect to ASUM is changed distribution of energy in the frequency domain.

Next, at S240, the extent of jerk relative to acceleration, or JI, is determined for period T based on the ASUM and JSUM determined for period T. According to some embodiments, JI (s$^{-1}$)=JSUM/ASUM. Based on the above relationship Jerk$_{max}$=2*A$_{max}$, the limit of JI is 2.

JI indicates how the combination of kinetic and potential energy influences the structure. JI indicates the extent of shifts in acceleration values over the measurement period. Such shifts in acceleration are associated with physical "actions", which may be either external (variations, or "jerks", in external load) or degree of shifts between potential and kinetic energy within the structure (e.g., stick/slip behavior, squeaking, or rattling due to structural discontinuities).

As JI grows, the frequency of the action and of the oscillations of the structure also grow with an upper limit of JI=2. A JI approaching the lower limit 0 implies uninhibited/constant acceleration over the measurement interval the period, such as during freefall. Nevertheless, a change in JI is ambiguous as it pertains to structural characteristics, as it is difficult to distinguish, based solely on JI, between changes in structural behavior and in properties of the load acting on the structure. It may also be influenced by the polling frequency.

Figure 4:
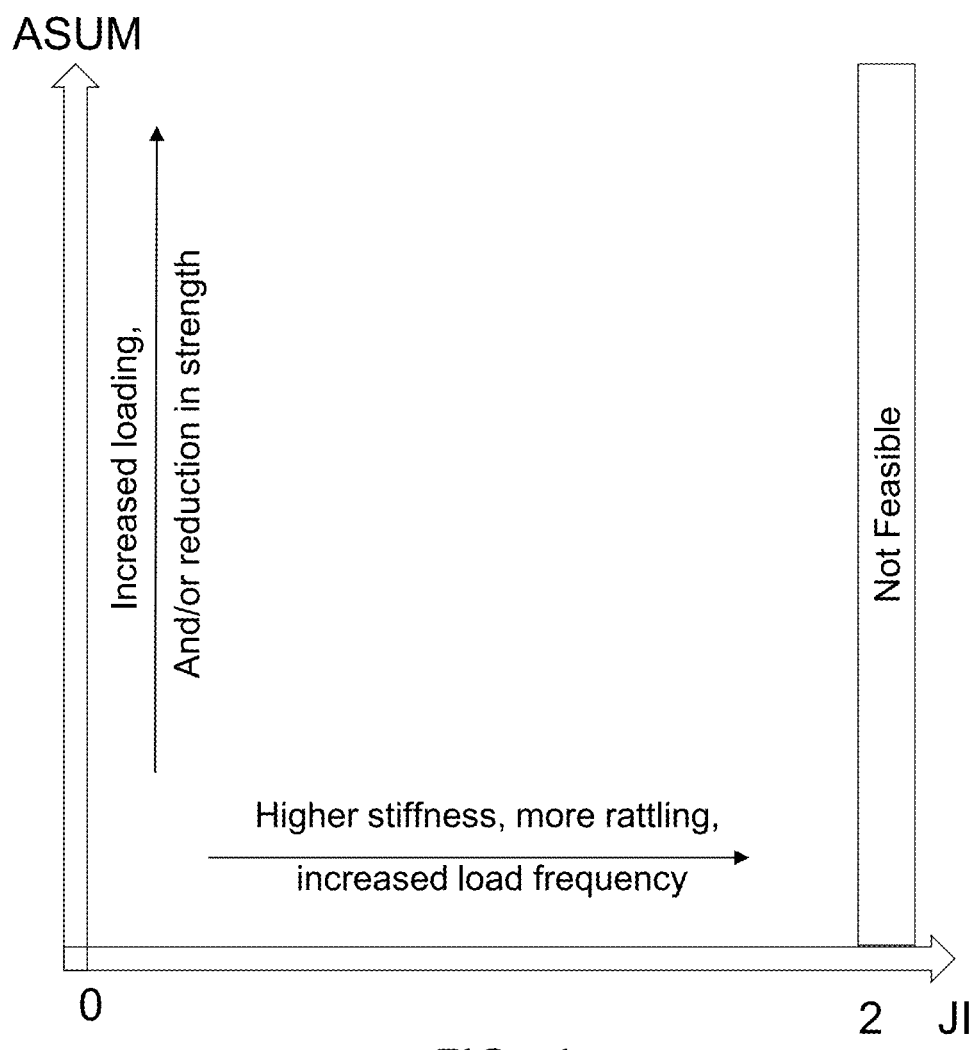
FIG. 4 illustrates correlations between physical characteristics and values of ASUM and JI according to some embodiments.

FIG. 4 illustrates relationships between values of ASUM and JI according to some embodiments, and assuming constant mass. As illustrated, an increase in ASUM indicates a higher external load within an intact structure and/or reduced strength in the structure. An increase in JI, which has an upper limit of 2, is indicative of higher "average" frequency oscillations. Although neither a single ASUM value nor a single JI value, taken separately or together, will typically be dispositive in determining the condition of a structure, the present inventors have identified the usefulness of evaluating contemporaneous trends exhibited by the values of these indicators. Specifically, evaluation of ASUM and JI over time facilitates detection of changes in external load magnitudes or characteristics, and/or detect structural changes such as fractures or corrosion.

S250 therefore comprises a determination of whether the determined JI and ASUM value indicate an alert condition. The determination at S250 may also consider historical JI and ASUM values since, as described below, historical trends in these values may be indicative of structural changes. Any rules or logic (including but not limited to a trained neural network) may be used at S250 to determine whether determined ASUM and JI values indicate an alert condition.

FIG. 5 shows table 500 according to some embodiments. Table 500 provides possible structural conditions associated with various combinations of trends/values of ASUM and JI. Specifically, for each of the trends/values Falling/low, Stable and Increasing/high of JI, table 500 specifies a condition which may exist if ASUM is contemporaneously Falling/low, Stable or Increasing/high. As shown, an increasing or high ASUM coupled with an increasing/high or decreasing/low JI may be indicative of structural issues. Accordingly, in some embodiments, S250 may comprise a determination of whether ASUM is increasing over time while JI is decreasing over time.

The determination at S250 may be at least partially time-series based. For example, the determination may detect sudden or gradual changes of ASUM over time, which may indicate either changed external load or changed structural capacity. Similarly, changes to JI over time may be detected, which may indicate changed properties of the application of external load or changed properties in structure.

The determination at S250 may be also or alternatively position-series based. For example, the ASUM associated with symmetric positions (i.e., determined based on accelerometer data generated by accelerometers mounted to locations that should respond similarly to load) may be compared to one another, where a position associated with a relatively higher ASUM may exhibit less strength than other positions. The JI associated with otherwise symmetric positions may also be compared, where a relatively decreasing value indicates either lower frequency oscillations or non-linearities (such as cracks) causing rattling at the associated position.

In other observations, a JI close to 2 and a ASUM may imply a highly-impulsive load or behavior, and/or persistent stick-slip and/or rattling behavior. Large variations in JI from high to low over a time period in conjunction with a high ASUM may imply non-linear behavior (e.g., partly elastic/continuous, partly impulsive) such as opening and closing joints/cracks.

A low JI compared to a historical average may imply weakening, which allows forces more time to work up momentum in the structure (i.e., the corresponding acceleration values are positive/negative over long periods of time). Moreover, relative changes in JI in one direction as compared to other directions may imply changes to structural properties in one of the directions.

If it is determined at S250 that the JI and ASUM values do not indicate an alert condition, flow returns to S210 to receive additional acceleration data and compute updated ASUM and JI values as described above. An alert is sent at S260 if the determination at S250 is positive. The alert may be sent via a monitoring application or by any other suitable means. The alert may include a report of the ASUM and JI values (and their associated accelerometer(s) which raised the alert condition) and may be sent to any appropriate personnel. In some embodiments, the alert also or alternatively triggers additional conventional analysis of the acceleration data in order to verify or gain additional insight into the alert condition.

Figure 6:
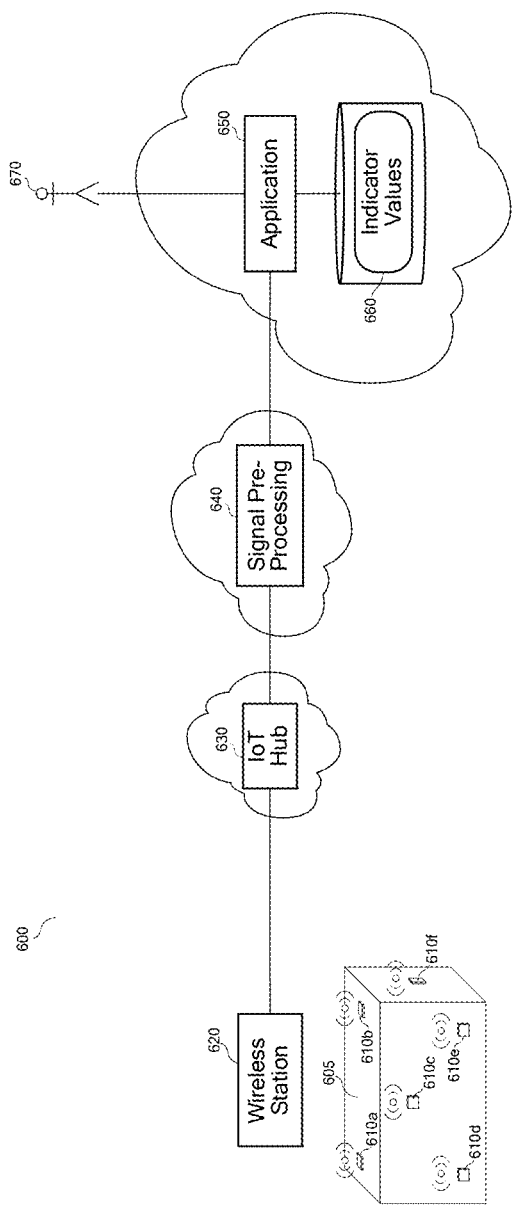
FIG. 6 is a block diagram of a cloud-based architecture to evaluate structural behavior using multiple accelerometers according to some embodiments.

FIG. 6 is a block diagram of an architecture of system 600 according to some embodiments. System 600 may comprise an implementation of system 100 of FIG. 1. As discussed with respect to system 100, each illustrated element of system 600 may be implemented using any suitable combination of computing hardware and/or software that is or becomes known, including cloud-based services.

Structure 605 has been equipped with accelerometers 610a through 610f. Accelerometers 610a through 610f may be mounted to structure 605 via any suitable means and need not be identical to one another (or identically mounted to structure 605). Some of accelerometers 610a through 610f are disposed different orientations than others due to their placement on different non-coplanar faces of structure 605. According to some embodiments, even those of accelerometers 610a through 610f which are mounted to a same face of structure 605 may be rotated with respect to one another. Accordingly, accelerometers 610a through 610f may be calibrated in some embodiments to each output signals corresponding to a common one, two or three orthogonal directions (e.g., x, x-y, x-y-z).

All of accelerometers 610a through 610f transmit acceleration data wirelessly, and such data may be received by wireless station 620. According to one example, each of accelerometers 610a through 610f transmits one hundred acceleration values per second per monitored direction to wireless station 620. Wireless station 620 collects the received samples into a package representing a ten-minute period (i.e., 600 samples per accelerometer per direction), and transmits the package to Internet-of-Things (IoT) hub 630. Embodiments are not limited thereto.

IoT hub 630 provides mechanisms for receiving and handling high-volume data streams. IoT hub 630 may be executed by one or more cloud-based servers. Each of the servers may comprise a virtual machine as is known in the art. IoT hub 630 may unpackage the samples, create batches of samples representing five-minute intervals, and transmit the batches to signal pre-processing component 640.

Signal pre-processing component 640 may also execute on a cloud-based server. Signal pre-processing component 640 may remove noise and reconstruct missing data from the batches and transmit the pre-processed batches to application 650. According to some embodiments, signal pre-processing component 640 also subtracts a long-term average amplitude (i.e., value a discussed above) from each sample to facilitate the subsequent calculation of ASUM and/or executes a coordinate transformation on the samples if such a transformation was not already accounted for via pre-calibration of accelerometers 610e through 610f.

Application 650 may execute within its own server to determine and store indicator values 660 based on the pre-processed batches as described above with respect to process 200. Application 650 may also determine whether to raise an alarm based on the present and historical indicator values.

User 670 may access application 650 to review alerts, indicator values, and possibly also the acceleration data based on which the indicator values were calculated. For example, application 650 may provide a user interface for selecting and presenting graphs of indicator values for one or more accelerometers over any time period (e.g., day, hour, week). The values could be presented as averages, maximums, minimums, etc.

Figure 7:
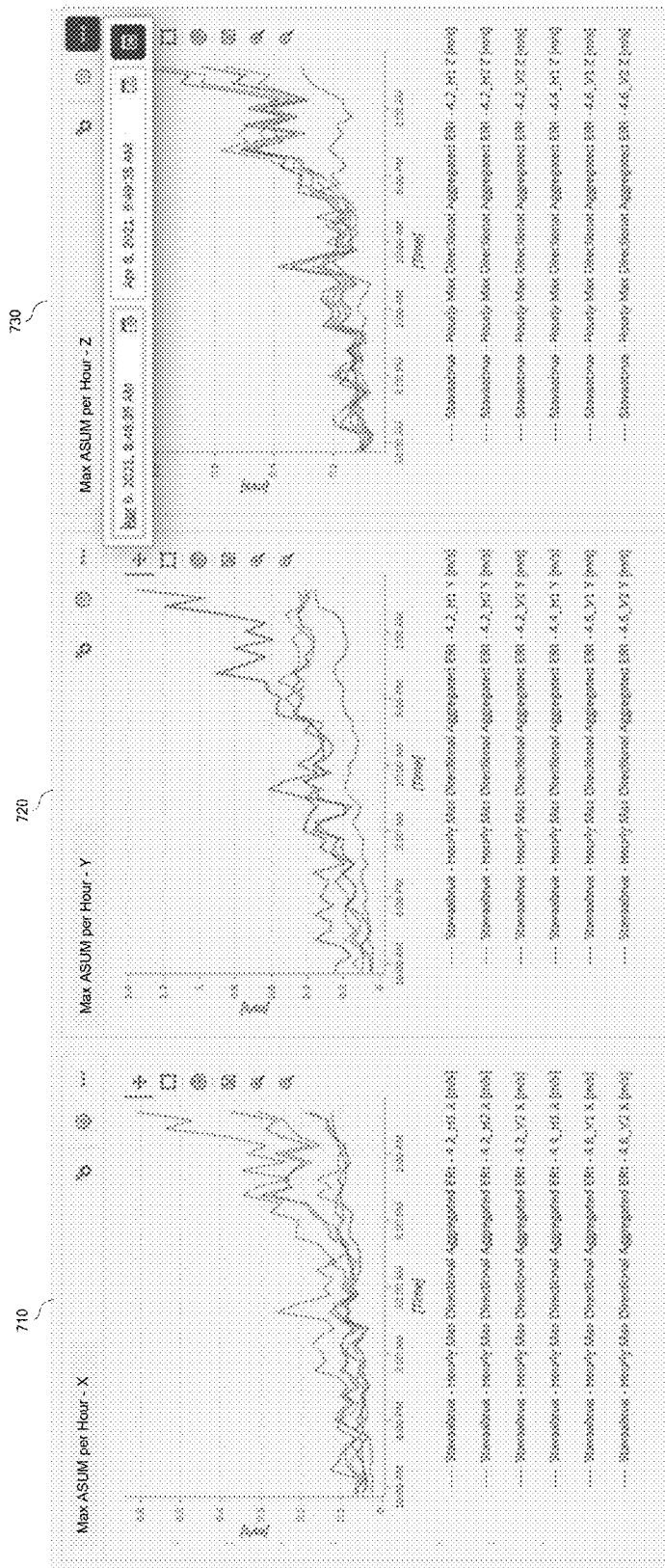
FIG. 7 illustrates graphical interfaces presenting ASUM values according to some embodiments. [INVENTORS—Note this figure is in informal form]

FIG. 7 depicts user interfaces 710, 720 and 730 which may be presented to user 670 by application 650 according to some embodiments. Each graphed line of user interfaces 710, 720 and 730 represents a maximum ASUM per hour in a given direction for a given accelerometer. User interface 710 represents ASUM values in the x-direction, user interface 720 represents ASUM values in the y-direction, and user interface 730 represents ASUM values in the z-direction.

Such alerts may be pushed to user 150 of monitoring application 130. According to some embodiments, user 150 may access monitoring application 130 to review and analyze acceleration values 142 and/or indicator values 144 which are derived from acceleration values 142.

Figure 8:
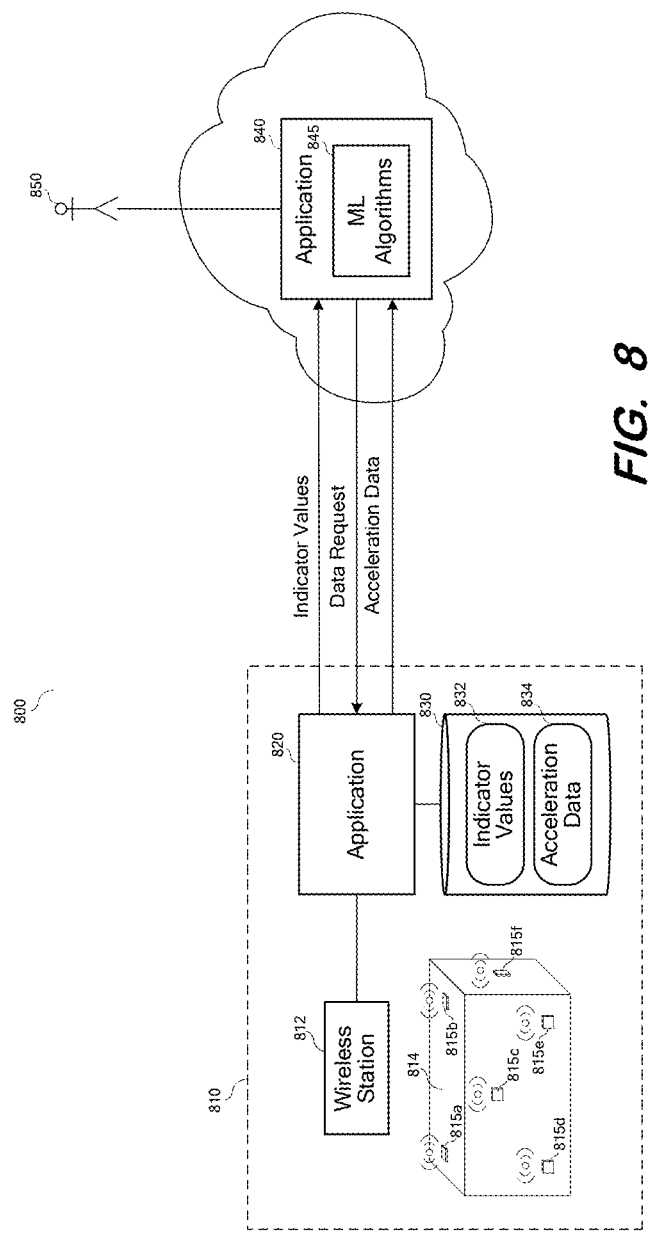
FIG. 8 is a block diagram of an architecture to evaluate structural behavior using multiple accelerometers in which ASUM and JI values are calculated local to the accelerometers according to some embodiments.

FIG. 8 is a block diagram of architecture 800 according to some embodiments. Dashed line 810 indicates components which are local to structure 814 in that communication therebetween does not require cloud-based communication. Accelerometers 815a through 815f and wireless station 812 may be configured as described above with respect to accelerometers 610a through 610f and wireless station 620.

Application 820 may execute on a local server and receive acceleration data from wireless station 812. Application 820 may store the acceleration data as acceleration data 834 of local storage 830 and determine indicator values 832 therefrom as described above. As shown, application 820 may transmit the determined indicator values to cloud-based application 840. Advantageously, the bandwidth requirements for transmission of the indicator values are significantly less than the bandwidth required to transmit the package of acceleration data as described above. Moreover, application 820 may include logic to prevent transmission of "uninteresting" indicator values, such as NULLs, mere stochastic noise or stable mid-range indicator values, thereby further reducing bandwidth requirements.

Application 840 may operate as described above to determine alert conditions based on the received indicator values. Application 850 uses machine-learned algorithms 845 (e.g., implemented by a trained neural network) to execute such a determination, but embodiments are not limited thereto. Application 840 may also determine, based on the received indicator values, that further information is needed to evaluate the condition of structure 814. Application 840 may therefore transmit a data request for specific portions of acceleration data 834 to application 820, which returns the requested acceleration data 834 in response.

Due to its proximity to wireless station 812, application 820 is also suited to perform functions which require quick reaction based on the indicator values. For example, if application 820 detects a severe fault in structure 814 (e.g., rapidly falling towards JI=0, freefall) based on the indicator values and structure 814 is a bridge or other roadway, application 820 may activate stop lights and/or barriers on either end of the roadway. Were these functions assigned to a cloud-based application such as application 840, the reaction delay due to communication latency could have catastrophic consequences.

Figure 9:
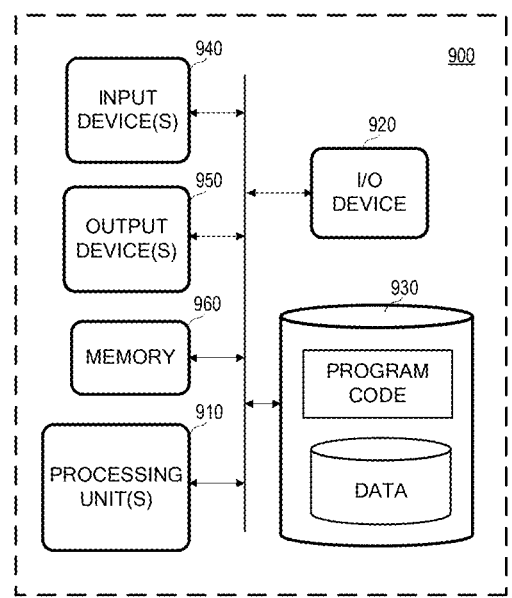
FIG. 9 is a block diagram of a computing system according to some embodiments.

FIG. 9 is a block diagram of a computing system according to some embodiments. System 900 may comprise a general-purpose computing apparatus and may execute program code to perform any of the functions described herein, including but not limited to process 200. System 900 may be implemented by a standalone computing device, a distributed cloud-based server, or other system and may include other unshown elements according to some embodiments.

System 900 includes processing unit(s) 910 operatively coupled to an I/O device 920, data storage device 930, one or more input devices 940, one or more output devices 950 and memory 960. I/O device 920 may facilitate communication with external devices, such as an external network, the cloud, or a data storage device. Input device(s) 940 may comprise, for example, a keyboard, a keypad, a mouse or other pointing device, a microphone, knob or a switch, an infra-red (IR) port, a docking station, and/or a touch screen. Input device(s) 940 may be used, for example, to enter information into system 900. Output device(s) 950 may comprise, for example, a display (e.g., a display screen) a speaker, and/or a printer.

Data storage device 930 may comprise any appropriate persistent storage device, including combinations of magnetic storage devices (e.g., magnetic tape, hard disk drives and flash memory), optical storage devices, Read Only Memory (ROM) devices, and RAM devices, while memory 960 may comprise a RAM device.

Data storage device 930 stores program code executed by processing unit(s) 910 to cause system 900 to implement any of the components and execute any one or more of the processes described herein. Embodiments are not limited to execution of these processes by a single computing device. Data storage device 930 may also store data and other program code for providing additional functionality and/or which are necessary for operation of system 900, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation some embodiments may include a processor to execute program code such that the computing device operates as described herein.

Embodiments described herein are solely for the purpose of illustration. Those in the art will recognize that other embodiments may be practiced with modifications and alterations to that described above.

What is claimed is:

1. A method comprising:
receiving, for each of a first plurality of consecutive time periods, an acceleration value associated with a first location of a structure supporting a roadway;
determining a first value of a first indicator based on absolute values of the acceleration values;
determining a plurality of pairs of consecutive-in-time acceleration values of the received acceleration values;
determining differences between the acceleration values of each of the plurality of pairs of consecutive-in-time acceleration values;
determining absolute values of the differences between the acceleration values of each of the plurality of pairs of consecutive-in-time acceleration values;
determining a second value of a second indicator by determining a sum of the absolute values of the differences between the acceleration values of each of the plurality of pairs of consecutive-in-time acceleration values;
determining a first value of an index based on the first value and the second value;
identifying a structural fault of the structure based on the first value of the first indicator and the first value of the index; and in response to identifying the structural fault, activating a barrier on an end of the roadway to prevent traffic from entering the roadway.

2. A method according to claim 1,
wherein determining the first value of the first indicator comprises determining a sum of the absolute values of the acceleration values.

3. A method according to claim 2, further comprising:
normalizing the absolute values of the acceleration values based on an average acceleration value,
wherein determining the first value of the first indicator comprises determining a sum of the normalized absolute values.

4. A method according to claim 1, further comprising:
receiving, for each of the first plurality of consecutive time periods, a second acceleration value associated with a second location of the structure;
determining a third value of the first indicator based on absolute values of the second acceleration values;
determining a second plurality of pairs of consecutive-in-time second acceleration values of the received second acceleration values;
determining second differences between the second acceleration values of each of the second plurality of pairs of consecutive-in-time second acceleration values;
determining second absolute values of the second differences between the second acceleration values of each of the second plurality of pairs of consecutive-in-time second acceleration values;
determining a fourth value of the second indicator by determining a sum of the absolute values of the second differences between the second acceleration values of each of the second plurality of pairs of consecutive-in-time second acceleration values; and
determining a second value of the index based on the third value and the fourth value,
wherein determination of the alert condition is based on the first value of the first indicator, the first value of the index, the second value of the first indicator, and the second value of the index.

5. A method according to claim 4, further comprising:
receiving, for each of a second plurality of consecutive time periods prior to the first plurality of time periods, a third acceleration value associated with the first location of the structure;
determining a fifth value of the first indicator based on absolute values of the third acceleration values;
determining a third plurality of pairs of consecutive-in-time third acceleration values of the received third acceleration values;
determining third differences between the third acceleration values of each of the third plurality of pairs of consecutive-in-time third acceleration values;
determining third absolute values of the third differences between the third acceleration values of each of the third plurality of pairs of consecutive-in-time third acceleration values;
determining a sixth value of the second indicator by determining a sum of the third absolute values of the third differences between the third acceleration values of each of the third plurality of pairs of consecutive-in-time third acceleration values; and
determining a third value of the index based on the fifth value and the sixth value,
wherein determination of the alert condition is based on the first value of the first indicator, the first value of the index, the third value of the first indicator, the second value of the index, the fifth value of the first indicator, and the third value of the index.

6. A method according to claim 1, further comprising:
receiving, for each of a second plurality of consecutive time periods prior to the first plurality of time periods, a second acceleration value associated with the first location of the structure;
determining a third value of the first indicator based on absolute values of the second acceleration values;
determining a second plurality of pairs of consecutive-in-time second acceleration values of the received second acceleration values;
determining second differences between the second acceleration values of each of the second plurality of pairs of consecutive-in-time second acceleration values;
determining second absolute values of the second differences between the second acceleration values of each of the second plurality of pairs of consecutive-in-time second acceleration values;
determining a fourth value of the second indicator by determining a sum of the second absolute values of the second differences between the second acceleration values of each of the second plurality of pairs of consecutive-in-time second acceleration values; and
determining a second value of the index based on the third value and the fourth value,
wherein determination of the alert condition is based on the first value of the first indicator, the first value of the index, the third value of the first indicator and the second value of the index.

7. A system comprising:
a first accelerometer mounted to a first location of a structure supporting a roadway, the first accelerometer to generate, for each of a first plurality of consecutive time periods, an acceleration value associated with the first location; and
a computing system to:
determine a first value of a first indicator based on absolute values of the acceleration values;
determine a plurality of pairs of consecutive-in-time acceleration values of the received acceleration values;
determine differences between the acceleration values of each of the plurality of pairs of consecutive-in-time acceleration values;
determine absolute values of the differences between the acceleration values of each of the plurality of pairs of consecutive-in-time acceleration values;
determine a second value of a second indicator by determining a sum of the absolute values of the differences between the acceleration values of each of the plurality of pairs of consecutive-in-time acceleration values;
determine a first value of an index based on the first value and the second value;
identify a structural fault of the structure based on the first value of the first indicator and the first value of the index; and
in response to the identification of the structural fault, activating a barrier on an end of the roadway to prevent traffic from entering the roadway.

8. A system according to claim 7,
wherein determination of the first value of the first indicator comprises determining a sum of the absolute values of the acceleration values.

9. A system according to claim 8, the computing system further to:
normalize the absolute values of the acceleration values based on an average acceleration value,
wherein determination of the first value of the first indicator comprises determination of a sum of the normalized absolute values.

10. A system according to claim 7, further comprising:
a second accelerometer mounted to a second location of the structure, the second accelerometer to generate, for each of the first plurality of consecutive time periods, an acceleration value associated with the second location,
the computing system further to:
determine a third value of the first indicator based on absolute values of the second acceleration values;
determine a second plurality of pairs of consecutive-in-time second acceleration values of the received second acceleration values;
determine second differences between the second acceleration values of each of the second plurality of pairs of consecutive-in-time second acceleration values;
determine second absolute values of the second differences between the second acceleration values of each of the second plurality of pairs of consecutive-in-time second acceleration values;
determine a fourth value of the second indicator by determining a sum of the second absolute values of the second differences between the second acceleration values of each of the second plurality of pairs of consecutive-in-time second acceleration values; and
determine a second value of the index based on the third value and the fourth value,
wherein determination of the alert condition is based on the first value of the first indicator, the first value of the index, the second value of the first indicator, and the second value of the index.

11. A system according to claim 10,
the first accelerometer further to generate, for each of a second plurality of consecutive time periods prior to the first plurality of time periods, a third acceleration value associated with the first location, and
the computing system further to:
determine a fifth value of the first indicator based on absolute values of the third acceleration values;
determine a third plurality of pairs of consecutive-in-time third acceleration values of the received third acceleration values;
determine third differences between the third acceleration values of each of the third plurality of pairs of consecutive-in-time third acceleration values;
determine third absolute values of the third differences between the third acceleration values of each of the third plurality of pairs of consecutive-in-time third acceleration values;
determine a sixth value of the second indicator by determining a sum of the third absolute values of the third differences of consecutive-in-time third acceleration values; and
determine a third value of the index based on the fifth value and the sixth value,
wherein determination of the alert condition is based on the first value of the first indicator, the first value of the index, the third value of the first indicator, the second value of the index, the fifth value of the first indicator, and the third value of the index.

12. A system according to claim 7,
the first accelerometer further to generate, for each of a second plurality of consecutive time periods prior to the first plurality of time periods, a second acceleration value associated with the first location of the structure, and the computing system further to:

determine a third value of the first indicator based on absolute values of the second acceleration values;

determine a second plurality of pairs of consecutive-in-time second acceleration values of the received second acceleration values;

determine second differences between the second acceleration values of each of the second plurality of pairs of consecutive-in-time second acceleration values;

determine second absolute values of the second differences between the second acceleration values of each of the second plurality of pairs of consecutive-in-time second acceleration values;

determine a fourth value of the second indicator by determining a sum of the second absolute values of the second differences between the second acceleration values of each of the second plurality of pairs of consecutive-in-time second acceleration values; and determine a second value of the index based on the third value and the fourth value, wherein determination of the alert condition is based on the first value of the first indicator, the first value of the index, the third value of the first indicator and the second value of the index.

13. A non-transitory computer-readable medium storing program code executable by a processing unit to cause a computing system to:

receive, for each of a first plurality of consecutive time periods, an acceleration value associated with a first location of a structure supporting a roadway;

determine a first value of a first indicator based on absolute values of the acceleration values;

determine a plurality of pairs of consecutive-in-time acceleration values of the received acceleration values;

determine differences between the acceleration values of each of the plurality of pairs of consecutive-in-time acceleration values;

determine absolute values of the differences between the acceleration values of each of the plurality of pairs of consecutive-in-time acceleration values;

determine a second value of a second indicator by determining a sum of the absolute values of the differences between the acceleration values of each of the plurality of pairs of consecutive-in-time acceleration values;

determine a first value of an index based on the first value and the second value;

identify a structural fault of the structure based on the first value of the first indicator and the first value of the index; and in response to identification of the structural fault, activate a barrier on an end of the roadway to prevent traffic from entering the roadway.

14. A medium according to claim 13, wherein determination of the first value of the first indicator comprises determination of a sum of the absolute values of the acceleration values.

15. A medium according to claim 14, the program code executable by a processing unit to cause a computing system to:

normalize the absolute values of the acceleration values based on an average acceleration value, wherein determination of the first value of the first indicator comprises determining a sum of the normalized absolute values.

16. A medium according to claim 13, the program code executable by a processing unit to cause a computing system to:

receive, for each of the first plurality of consecutive time periods, a second acceleration value associated with a second location of the structure;

determine a third value of the first indicator based on absolute values of the second acceleration values;

determine a second plurality of pairs of consecutive-in-time second acceleration values of the received second acceleration values;

determine second differences between the second acceleration values of each of the second plurality of pairs of consecutive-in-time second acceleration values;

determine second absolute values of the second differences between the second acceleration values of each of the second plurality of pairs of consecutive-in-time second acceleration values;

determine a fourth value of the second indicator by determining a sum of the second absolute values of the second differences between the second acceleration values of each of the second plurality of pairs of consecutive-in-time second acceleration values; and determine a second value of the index based on the third value and the fourth value, wherein determination of the alert condition is based on the first value of the first indicator, the first value of the index, the second value of the first indicator, and the second value of the index.

17. A medium according to claim 16, the program code executable by a processing unit to cause a computing system to:

receive, for each of a second plurality of consecutive time periods prior to the first plurality of time periods, a third acceleration value associated with the first location of the structure;

determine a fifth value of the first indicator based on absolute values of the third acceleration values;

determine a third plurality of pairs of consecutive-in-time third acceleration values of the received third acceleration values;

determine third differences between the third acceleration values of each of the third plurality of pairs of consecutive-in-time third acceleration values;

determine third absolute values of the third differences between the third acceleration values of each of the third plurality of pairs of consecutive-in-time third acceleration values;

determine a sixth value of the second indicator by determining a sum of the third absolute values of the third differences between the third acceleration values of each of the third plurality of pairs of consecutive-in-time third acceleration values; and determine a third value of the index based on the fifth value and the sixth value, wherein determination of the alert condition is based on the first value of the first indicator, the first value of the index, the third value of the first indicator, the second value of the index, the fifth value of the first indicator, and the third value of the index.

18. A medium according to claim 17, the program code executable by a processing unit to cause a computing system to:

receive, for each of a second plurality of consecutive time periods prior to the first plurality of time periods, a second acceleration value associated with the first location of the structure;

determine a third value of the first indicator based on absolute values of the second acceleration values;

determine a second plurality of pairs of consecutive-in-time second acceleration values of the received second acceleration values;

determine second differences between the second acceleration values of each of the second plurality of pairs of consecutive-in-time second acceleration values;

determine second absolute values of the second differences between the second acceleration values of each of the second plurality of pairs of consecutive-in-time second acceleration values;

determine a fourth value of the second indicator by determining a sum of the second absolute values of the second differences between the second acceleration values of each of the second plurality of pairs of consecutive-in-time second acceleration values; and determine a second value of the index based on the third value and the fourth value, wherein determination of the alert condition is based on the first value of the first indicator, the first value of the index, the third value of the first indicator and the second value of the index.

\* \* \* \* \*